United States Patent
Katz et al.

[11] 3,965,428
[45] June 22, 1976

[54] SPECTRUM-SHAPE DISCRIMINATING ON/OFF TARGET INDICATOR

[75] Inventors: Joel Katz; James R. Pousson, both of Los Angeles, Calif.

[73] Assignee: The United States of America as represented by the Secretary of the Air Force, Washington, D.C.

[22] Filed: Jan. 4, 1971

[21] Appl. No.: 105,748

[52] U.S. Cl. .............................. 325/474; 325/477; 343/18 E; 328/149
[51] Int. Cl.² .......................................... H04B 1/10
[58] Field of Search ............ 343/5 R, 17.1 R, 18 E; 325/473, 477, 474; 328/146, 147, 149

[56] References Cited
UNITED STATES PATENTS
3,351,927  11/1967  Stinson ........................... 328/147 X
3,769,591  10/1973  Brown et al. ....................... 325/474

Primary Examiner—T. H. Tubbesing
Attorney, Agent, or Firm—Joseph E. Rusz; George Fine

[57] ABSTRACT

A spectrum-shaped discriminating on/off target indicator which indicates if a signal simultaneously meets prescribed conditions on power level and spectrum shape. Signal power level and spectrum width are simultaneously measured and a DC logic output is obtained only for input signals which have a signal-to-noise ratio equal to, or higher than a preset minimum level though the signal "noise bandwidth" meets the prescribed conditions.

2 Claims, 2 Drawing Figures

SPECTRUM-SHAPE DISCRIMINATING ON/OFF TARGET INDICATOR

BACKGROUND OF THE INVENTION

This invention relates to a spectrum-shape discriminator and more particularly to a spectrum-shape discriminating on/off target indicator when a signal simultaneously meets prescribed conditions on power level and spectrum shape.

The apparatus of this invention is an adaptive threshold which indicates if a signal simultaneously meets prescribed conditions on power level and spectrum shape. The invention yields a DC logic output only if the input spectrum has an equivalent "noise bandwidth" equal to, or less than, the maximum width expected for desired signals even through the power level meets the prescribed conditions. A DC logic output is obtained only for input signals which have a signal-to-noise ratio equal to or higher than a preset minimum level though the signal "noise bandwidth" meets the prescribed conditions.

One conventional method to determine signal power level is to measure the automatic gain control (AGC) voltage developed within a receiver. This AGC voltage is compared with a reference voltage in a voltage comparator to establish the minimum acceptable signal-to-noise ratio. Another method is to compare the DC voltage out of the detector of a delayed AGC receiver with a reference voltage in a comparator to obtain a DC logic indication of acceptable signal-to-noise ratio. Spectrum shape is usually determined by the relative DC levels out of a number of equal bandwidth, contiguous passband filters followed by detectors. When AGC, or a limiter, is used in the receiver ahead of the contiguous filters, their constant total-power properties give the system some capability to detect changes in spectral density due to changes in power level or spectral shape.

The advantages of the apparatus of the invention are that the signal power level and spectrum width are simultaneously measured. Unlike the AGC voltage comparison method, this invention will not yield a threshold crossing on undesirable input spectrums, such as broadband, high-level noise. This invention has superior capability to resolve spectrum width over the limiter or AGC and multiple filter bank method. Even when the bandwidth of each filter in the multiple filter bank is a fraction of the "accept" bandwidth of this invention, there are combinations of power level and spectrum width which make the indication ambiguous. A wide spectrum begins to cross only a few thresholds because the power density is reduced by the limiter on AGC to nearly the density obtained on thermal noise. But, because only a few thresholds are crossed, the logic indicates that a narrow spectrum, low level signal is present and accepts this undesirable signal. This does not occur with the present invention. If the spectrum is too wide, it is treated as thermal noise and is rejected. This property comes about because the thresholds in this invention react to the differences in power density between the "accept" bandwidth and the "reject" adjacent filters. The new method is far more sensitive to indicating power level and spectrum width than the filter bank method, for an equal number of filters.

SUMMARY OF THE INVENTION

The apparatus of this invention is based on comparing the detected DC voltage difference between the outputs of a signal-centered bandpass filter, equal in bandwidth to the maximum spectral width of the desired signal, and two contiguous narrow bandwidth filters. The difference in the detected levels between the center filter and side filters is a function of spectral width of the signal as well as its signal-to-noise ratio. Consequently, for a given signal input, the relationship between the detected filter outputs and spectral width is established and used to reject signals whose spectral shape or power level do not meet the required criteria for acceptance.

Three filters are used to implement the invention (See FIG. 2). Detectors on the output of the three filters are used to measure the power density distribution versus frequency of signal. A uniform power density occurs across the passband of the filter set when broadband noise is present. The detector outputs are normalized by suppressing part of the DC output level. The resultant mean DC levels out of the detectors are equal for a noise input of constant power density. A threshold arrangement is set to cross whenever the power level in the center filter exceeds that of the side filters by a predetermined amount. Consequently, only signals having a high enough power level to cause an increase in the detected output of the center filter and with a frequency band narrow enough not to spill over into the two side filters will cross the threshold arrangement. The threshold system is sensitive to the difference between the detected outputs of the three filters and this difference is a function of both amplitude and spectral shape. A threshold crossing is an indication that the signal meets both requirements. Two side filters are used instead of one to give the invention a greater degree of flexibility. By the proper mechanization of the logic following the thresholds, sloping spectral shapes can be rejected as well as those that have an envelope that approximates a broad gaussian shape.

An object of the present invention is to provide a spectrum-shape discriminator which indicates if a signal simultaneously meets prescribed conditions on power level and spectrum shape.

Another object of the present invention is to provide a spectrum-shape discriminating on/off target indicator in which a DC logic output is obtained only for input signals having a signal-to-noise ratio equal to, or higher than a preset minimum level even though the signal "noise bandwidth" meets the prescribed conditions.

The features of this invention, which are believed to be new, are set forth with particularity in the appended claims. The invention itself, however, together with further objects and advantages thereof may best be understood by reference to the following description when taken in conjunction with the accompanying drawings.

DESCRIPTION OF THE PREFERRED EMBODIMENT

Figure 1:
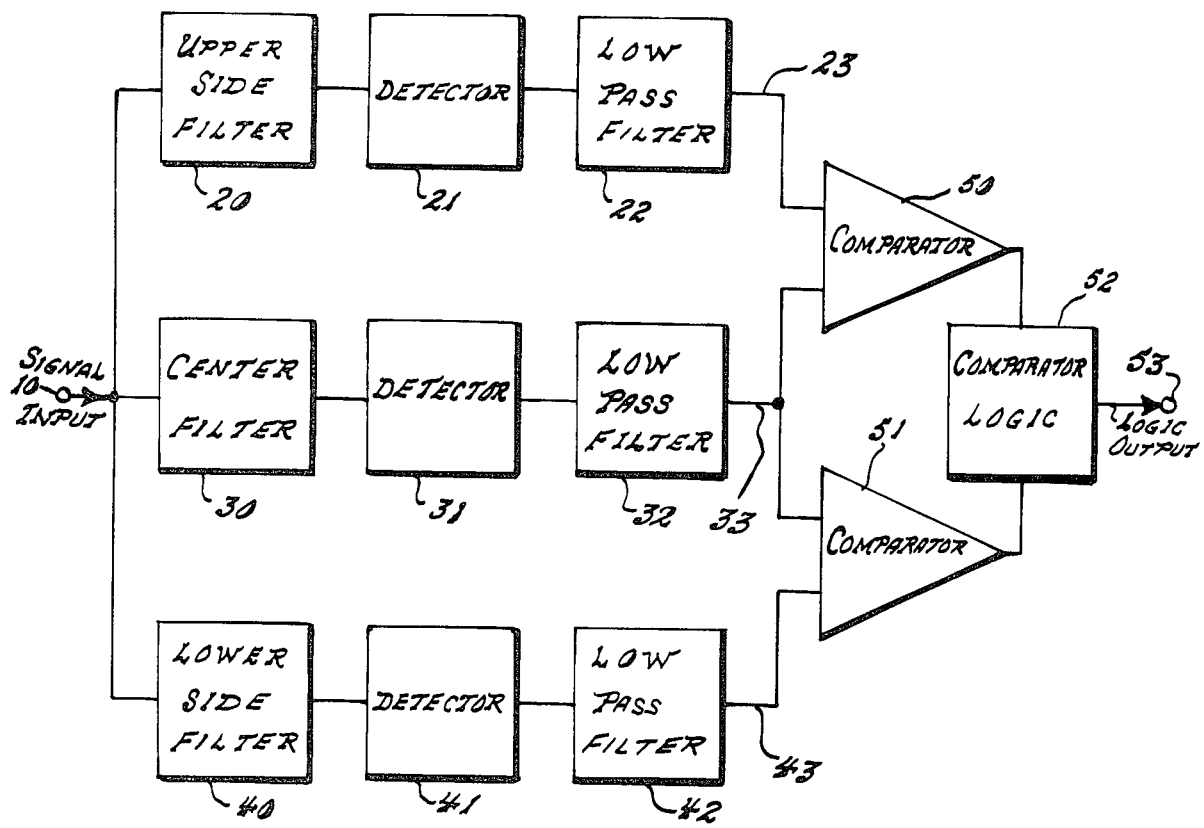
FIG. 1 is a block diagram of the spectrum-shape discriminating on/off target indicator of the invention.

Now referring in detail to FIG. 1, there are shown three parallel channels. The first channel consists of input upper side filter 20, detector 21, and low pass filter 22. The second channel consists of input center filter 30, detector 31, and low pass filter 32. The third channel consists of input low side filter 40, detector 41, and low pass filter 42. Upper side, center, and lower side filters 20, 30, and 40, respectively, receive a signal by way of input terminal 10. The detected DC voltage output channels 1 and 2 are fed to comparator 50. The detected DC voltage outputs from channels 2 and 3 are fed to comparator 51. The outputs from compararators 50 and 51 are fed to comparator logic circuit 52 and an output is provided at terminal 53. Logic circuit 52 is conventional.

The invention is based on comparing the detected DC voltage difference between the outputs of a signal-centered bandpass filter, equal in bandwidth to the maximum spectral width of the desired signal, and two contiguous narrow bandwidth filters. The difference in the detected levels between the center filter of channel 2 and the side filters of channel 1 and 3 is a function of spectral width of the input signal as well as its signal-to-noise ratio. Consequently, for a given signal input, the relationship between the detected filter outputs and spectral width is established and used to reject signals whose spectral shape or power level do not meet the required criteria for acceptance.

Figure 2:
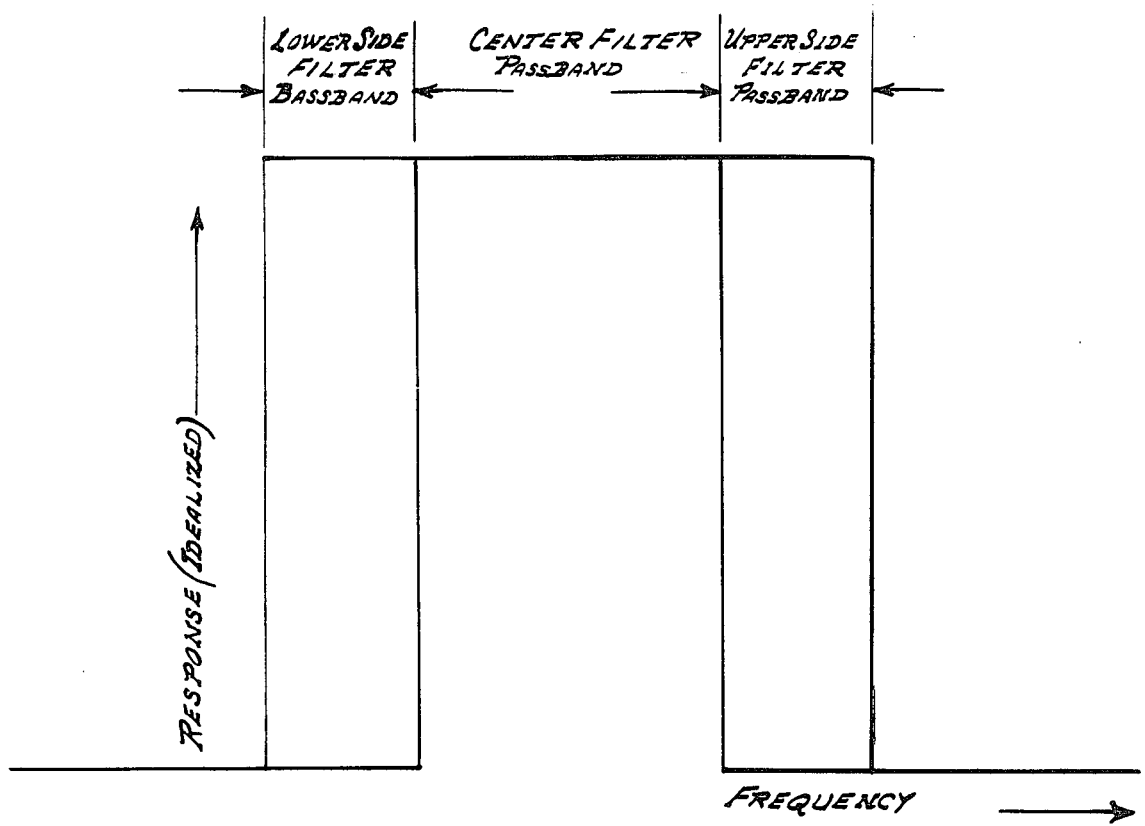
FIG. 2 shows the passband frequency positions of filters used in the spectrum-shape discriminating on/off target indicator.

The three upper, center, and lower filters 20, 30, and 40, respectively, used to implement the invention have their passband illustrated in FIG. 2. Detectors 21, 31, and 41 on the output of filters 20, 30, and 40, respectively, are used to measure the power density distribution versus frequency of the signal. A uniform power density occurs across the passband of the filter set when broadband noise is present. The detector outputs are normalized by suppressing part of the DC output level. The resultant mean DC levels out of the detectors are equal for a noise input of constant power density. A threshold arrangement is set to cross whenever the power level in the center filter exceeds that of the side filters by a predetermined amount. Consequently, only signals having a high enough power level to cause an increase in the detected output of the center filter and with a frequency band narrow enough not to spill over into the two side filters will cross the threshold arrangement. The threshold system is insensitive to the difference between the detected outputs of the three filters and this difference is a function of both amplitude and spectral shape. A threshold crossing is an indication that the signal meets both requirements. Two side filters are used instead of one to give the invention a greater degree of flexibility. By a proper mechanization of logic following the thresholds, sloping spectral shapes can be rejected as well as those that have an envelope that approximates a broad gaussian shape.

The invention has been implemented in the present base-line design of the Hughes AIM-47B Missile. The invention makes up part of the target acquisition system in the missile. Because of its use, the AIM-47B should have significantly better performance capability in main-lobe clutter environment than the earlier models of the same missile that did not make use of the invention.

We claim:

1. A spectrum-shape discriminating on/off target indicator comprising a center bandpass filter, equal in bandwidth to the maximum spectral width of the desired signal, first and second contiguous narrow bandwidth filters, each of said filters receiving a common input signal, first, second and third detectors receiving the output of said first contiguous filter, said center filter, and said second contiguous filter, respectively, first, second and third low pass filters receiving the DC output of said first, second, and third detectors, respectively, first and second comparators, said first comparator receiving the output of said first and second low pass filter, said second comparator receiving the output of said second and third low pass filters, and a logic circuit receiving the outputs from said first and second comparator, said logic circuit rejecting sloping spectral shapes and envelopes approximating broad gaussian shapes and providing a DC logic output signal only for input signals having a signal-to-noise ratio equal to or higher than a preset minimum level though the signal "noise bandwidth" meets prescribed conditions.

2. A spectrum-shape discriminating on/off target indicator as described in claim 1 wherein said first sideband filter is on the upper frequency side of said center bandpass filter and said second sideband filter is on the lower frequency side of said center bandpass filter.

* * * * *